United States Patent [19]
Gottfried

[11] Patent Number: 6,114,003
[45] Date of Patent: Sep. 5, 2000

[54] INSULATION BLANKET HAVING AN INNER METAL CORE AIR CELL AND ADJOINING OUTER INSULATION LAYERS

[75] Inventor: Samuel Gottfried, Riverdale, N.Y.

[73] Assignee: No Fire Technologies, Inc., Upper Saddle River, N.J.

[21] Appl. No.: 08/923,330

[22] Filed: Sep. 4, 1997

[51] Int. Cl.[7] ................................. B32B 5/02; B32B 1/04
[52] U.S. Cl. ................................. 428/73; 428/72; 428/74; 428/75; 428/623; 428/920; 428/921
[58] Field of Search ................................. 428/72, 73, 74, 428/75, 623, 116, 920, 921

[56] References Cited

U.S. PATENT DOCUMENTS

| | | | |
|---|---|---|---|
| 2,750,313 | 6/1956 | Schwartz et al. | 52/406.3 |
| 4,015,386 | 4/1977 | Cook | 52/232 |
| 4,038,447 | 7/1977 | Brock | 428/72 |
| 4,299,872 | 11/1981 | San Miguel et al. | 428/117 |
| 4,567,076 | 1/1986 | Therrien | 428/102 |
| 4,598,007 | 7/1986 | Kourtides et al. | 428/116 |
| 4,767,656 | 8/1988 | Chee et al. | 428/116 |
| 4,818,595 | 4/1989 | Ellis | 442/68 |
| 4,829,734 | 5/1989 | Schraff | 52/404.5 |
| 4,876,134 | 10/1989 | Saitoh et al. | 428/73 |
| 4,910,063 | 3/1990 | Holland et al. | 428/99 |
| 4,973,506 | 11/1990 | Bauer et al. | 428/73 |
| 5,074,090 | 12/1991 | Hafers | 52/406.3 |
| 5,277,959 | 1/1994 | Kourtides et al. | 428/116 |
| 5,540,022 | 7/1996 | Morris | 52/309.8 |
| 5,549,956 | 8/1996 | Handwerker | 428/73 |

*Primary Examiner*—Jill Warden
*Assistant Examiner*—LaToya I. Cross
*Attorney, Agent, or Firm*—Ezra Sutton

[57] ABSTRACT

An insulation blanket including an inner core air cell made of metal and having a first side for receiving a first composite and a second side for receiving a second composite. The first composite having a first inner layer formed of a metal foil sheet, a first middle layer formed of ceramic based sheets, and a first outer layer formed of an intumescent, fire-retardant coating on a fiber glass sheet; and the second composite having a second inner layer formed of a metal foil sheet, a second middle layer formed of ceramic based sheets, and a second outer layer formed of an intumescent, fire-retardant coating on a fiber glass sheet.

8 Claims, 13 Drawing Sheets

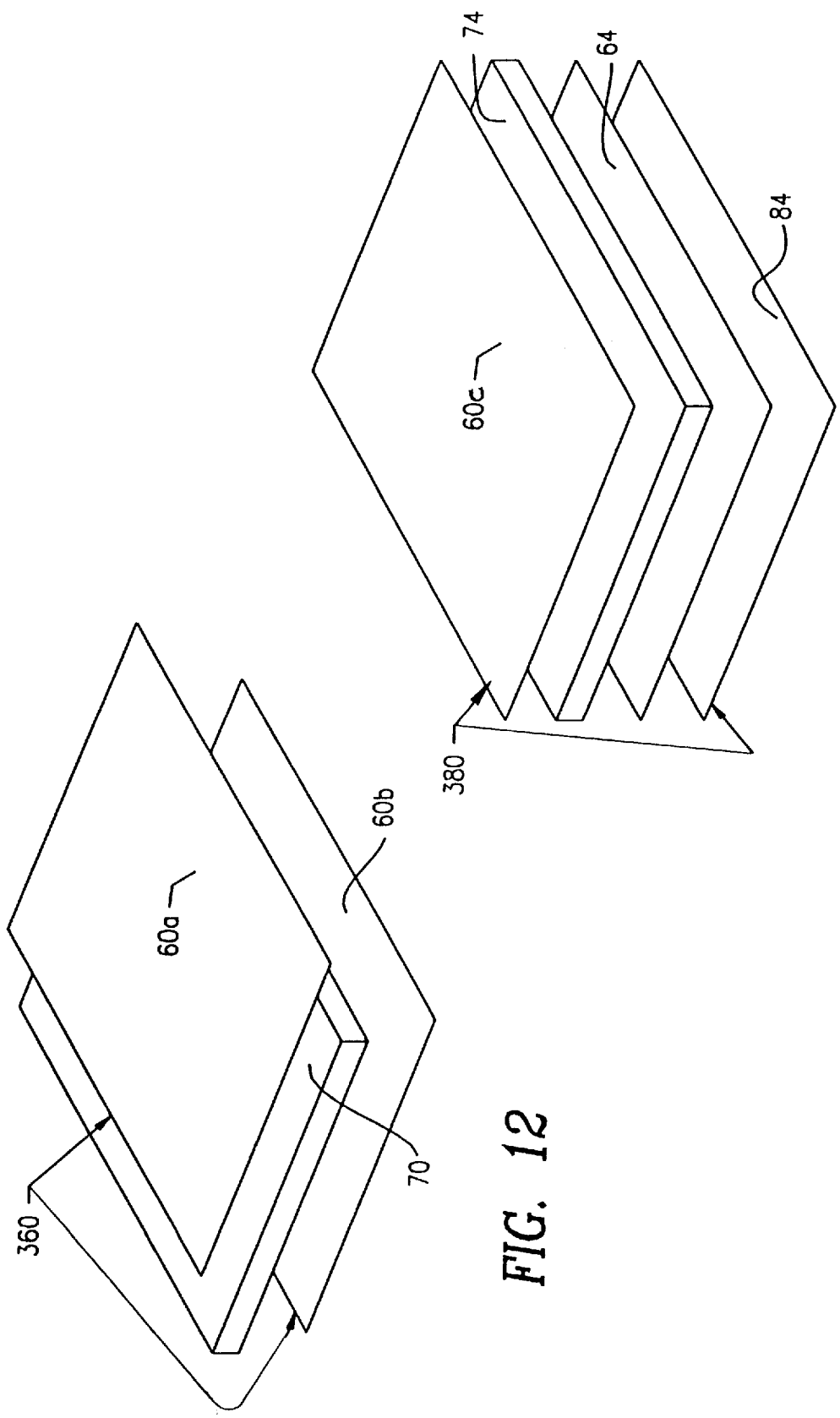

INSULATION BLANKET HAVING AN INNER METAL CORE AIR CELL AND ADJOINING OUTER INSULATION LAYERS

FIELD OF THE INVENTION

This invention relates to a flame and heat resistant insulation blanket/insulation panel used to protect hulls, bulkheads, overheads, and compartments of ships, aircraft, railway tanker cars, and tanker trucks. More particularly, the insulation blanket includes an inner metal core air cell with adjoining outer insulation layers made of an intumescent, fire-retardant, woven fiberglass layer and multiple refractory blanket layers.

BACKGROUND OF THE INVENTION

Insulation blankets and panels have been used for many years for protection from fire for bulkheads, overheads, hulls and compartments of aircraft, ships and the like, as certain areas within these aircraft or ships are both a potential source of ignition and a potential leakage of a flammable liquid and/or gas. In these areas, it is not possible to separate the potential ignition sources and any such leakage which could lead to a possible in transit explosion and/or fire. Areas within these aircraft or ships in which this separation cannot be accomplished are defined as fire zones and are required by various governmental agencies to be separated from other areas of the aircraft or ships by fireproof fire walls. Under FAA (Federal Aeronautics Administration) regulations, fire proofing means being able to withstand exposure to heat and flame at least as well as steel, or being able to withstand exposure to a 2000° F. flame for 15 minutes without flame penetration. In ships, the typical level of protection required is 60 minutes when exposed to heat conditions prescribed by the ASTM E119 standards or the U.S. Coast Guard A60 criterion, as provided by the International Maritime Organization (IMO) or 30 minutes when exposed to more severe conditions, as prescribed by UL 1709 standards. Typical designated fire zones include the regions in which are located engines or turbines or furnaces, any auxiliary power unit, fuel-burning heaters, and other combustion equipment intended for in transit use. For example, in aircraft, the combustion, turbine, and tailpipe sections of turbine engines must be isolated from the rest of the aircraft by a properly rated fire wall. In ships, the oil-burning furnaces and steam generators also must be isolated from the rest of the ship by a properly rated fire wall and overhead. In addition, substrates such as steel, aluminum, and many types of composites made of vinyl esters, polyesters, phenolics, and other types of resins, require a rated fire wall for the fire proofing of military installations, commercial buildings, and the like.

In most applications, current insulation blankets/insulation panels are impractical or provide reduced performance for many reasons, such as, heavy weight, thickness, or durability of the materials used, or the requirement of a top coating for surface finishing which adds a flammable top layer. In addition, spray-on fire proofing coatings are relatively difficult and time consuming to apply and to inspect, and are subject to cracking and peeling which then must be repaired or replaced frequently. This all adds up to increased installation costs, further maintenance costs and increased downtime for the aircraft and ships involved.

There remains a need for a fire retardant insulation blanket/insulation panel having the following desirable features of being thin and light weight; having high performance standards (such as meeting CG A60 or UL 1709 standards); a finished surface wall which requires no top coating; a minimal surface flame spread having a class A rating according to ASTM E84 standards; being easy to install which requires only simple butt joints and no reinforced joints and is non-toxic to humans in the virgin or combusted state.

DESCRIPTION OF THE PRIOR ART

Fire retardant insulation blankets/insulation panels of various designs, configurations and materials of construction have been disclosed in the prior art. For example, U.S. Pat. No. 4,973,506 discloses a composite insulation block or plate for the facing of a building. The composite plate is used for fire protection having fire insulation properties. The composite plate includes a honeycomb core layer; front and rear inner layers made of an epoxy resin laminate or aluminum; a decorative outer panel made of silicate; and a protective rear plate made of wallastonite and bonded with calcium silicate and mica.

U.S. Pat. No. 4,567,076 discloses a composite material structure with an integrated insulating blanket therein. The composite material structure includes a honeycomb core layer and laminate layers made from an epoxy matrix reinforced by graphite fibers. The insulation blanket includes a layer of insulation fill made of ceramic material; an inner face sheet made of a thermosetting matrix material; and an outer face sheet made of a woven ceramic fabric.

U.S. Pat. No. 5,074,090 discloses a self-supportive reflective insulation unit. The insulation unit consists of a metal, foil-covered corrugated cardboard structure of a rectangular shape. The insulation unit further includes a plurality of reflective sheets and insulating sheets for inhibiting the transfer of heat and the transfer of flames between insulation units. Reflective sheets are made of metal foil covered material, such as aluminum. Insulation sheets are made of fire-retardant materials. The insulation units are used in a stacking formation to make a fire wall.

U.S. Pat. No. 2,750,313 discloses a thermal insulation unit for use in buildings, refrigerators, vehicles, boxes, and the like. The insulation unit is in the form of a plurality of thin sheets to form a web structure. The insulation sheets may be made of aluminum foil, plastic, or the like.

U.S. Pat. No. 4,876,134 discloses a laminated panel having a stainless steel foil core for use in walls and floors, as an insulation barrier, which is used in ships and aircraft. This stainless steel core is formed into a honeycomb configuration by the laminating of a plurality of multi-layered folded sheets of stainless steel. The laminating is done by the use of an adhesive between each of the folded sheets, which then forms the honeycombed core.

None of the aforementioned prior art patents disclose the particular structure and design of the insulation blanket/insulation panel of the present invention.

Accordingly, it is an object of the present invention to provide an insulation panel made from a metal core air cell having multiple layers of insulation materials on both sides (three layers on each side) of the metal core air cell for use as a fireproof, flame and heat resistant insulation barrier for protecting hulls, bulkheads, overheads, and compartments of ships, aircraft, railway tanker cars, tanker trucks, and the like.

Another object of the present invention is to provide an insulation panel that is thin and light weight, easily installed, nontoxic to humans in the virgin or combusted state and has a finished surface wall or overhead which requires no top coating.

Another object of the present invention is to provide an insulation panel that has a minimal surface flame spread performance and which meets a class A rating according to ASTM E84 standards and has high fire-proofing quality performance standards which meets the CG A 60, UL 1709 and ASTM E119 criteria for the severe conditions of a fireproof barrier.

Another object of the present invention is to provide an insulation panel having a novel combination of fire retardant materials where the inner core metal air cell is made of either steel or aluminum covered on both sides by an inner first layer of steel or aluminum foil, a middle second layer of a ceramic-based material, and an outer third layer of an insulation material made of an intumescent, fire-retardant coating applied onto a fiberglass sheet material.

Another object of the present invention is to provide an insulation panel that can be used to protect a variety of substrates that include steel, aluminum, or wood; and many types of composites that include vinyl esters, polyesters, phenolics and other types of resins for use in fire proofing of military installations, warehouses, commercial buildings, and the like.

Another object of the present invention is to provide an insulation panel that can be used with new or existing ceiling or wall frame assemblies and is easily installed with simple butt joints, requiring no special or additional joinery, taping, or securing.

Another object of the present invention is to provide a light weight overhead insulation panel that can be used in modern high speed, aluminum ferry boats.

Another object of the present invention is to provide an insulation panel that is sturdy, durable, and resistant to normal abrasive wear and tear.

A further object of the present invention is to provide an insulation panel which can be easily manufactured, mass produced in an automated and economical manner, and is cost efficient for a variety of applications by the user.

SUMMARY OF THE INVENTION

In accordance with the present invention, there is provided an insulation blanket including an inner core air cell made of metal and having a first side for receiving a first composite and a second side for receiving a second composite. The first composite having a first inner layer formed of a metal foil sheet, a first middle layer formed of ceramic based sheets, and a first outer layer formed of an intumescent, fire-retardant coating on a fiber glass sheet; and the second composite having a second inner layer formed of a metal foil sheet, a second middle layer formed of ceramic based sheets, and a second outer layer formed of an intumescent, fire-retardant coating on a fiber glass sheet.

The inner core is made of steel or aluminum foil. The first and second inner layers are formed of steel or aluminum foil. The first and second middle layers are formed of ceramic fibers, mineral wool, fiberglass or silica. The first and second outer layers have a fiber or metal layer thereon of stainless steel, TYVEK™, NOMEX™, KEVLAR™, or aluminum.

The insulation blanket of the present invention includes a plurality of inner core air cells which form a module, wherein the inner core air cell is in the shape of a box having a bottom wall and four side walls and wherein the box is hollow.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein:

FIG. 12 is an exploded perspective view of the insulation panel of the third alternate embodiment of the present invention showing the upper composite insulation section having multi-layers of insulation sheets in an unassembled state;

FIG. 13 is an exploded perspective view of the insulation panel of the third alternate embodiment of the present invention showing the lower composite insulation section having multi-layers of insulation sheets in an unassembled state;

DETAILED DESCRIPTION OF THE EMBODIMENTS OVERVIEW

Figure 1:
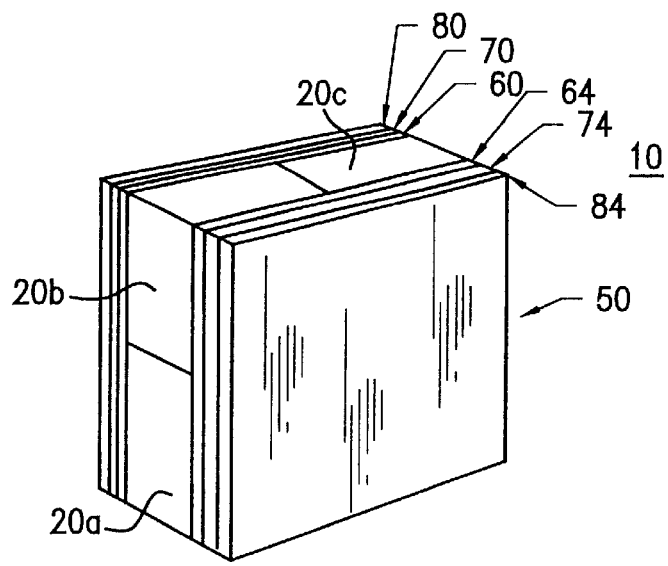
FIG. 1 is a side perspective view of the insulation panel of the preferred embodiment of the present invention showing the metal core air cells having multi-layers of insulation sheets on both sides of the air cells in an assembled state.
Figure 2:
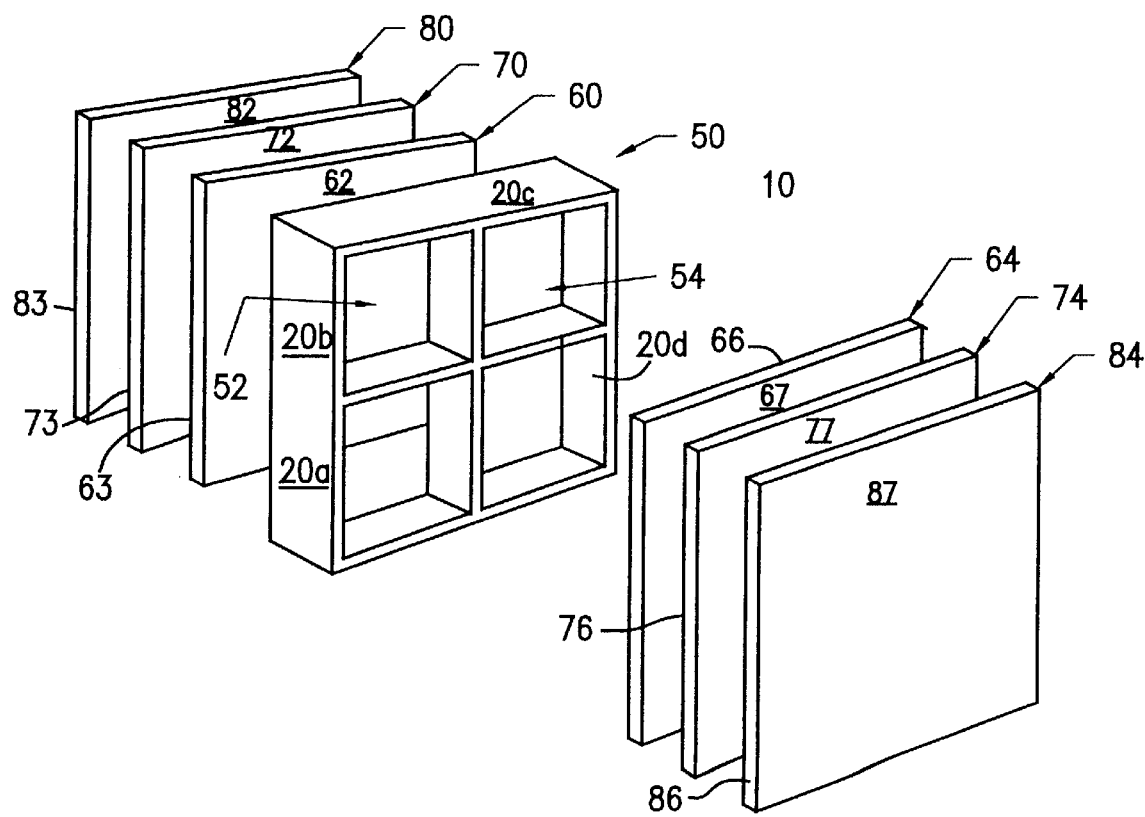
FIG. 2 is an exploded view of the insulation panel of the preferred embodiment of the present invention showing the metal core air cells having multi-layers of insulation sheets on both sides of the air cells in an unassembled state.
Figure 3:
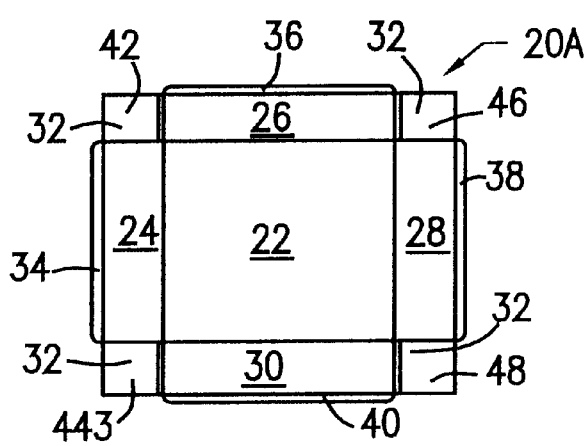
FIG. 3 is a top plan view of the insulation panel of the preferred embodiment of the present invention showing the one piece metal foil die cut and scored box blank.
Figure 4:
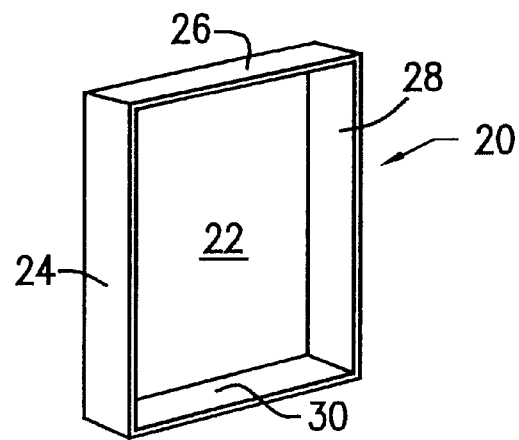
FIG. 4 is a rear perspective view of the insulation panel of the preferred embodiment of the present invention showing a single metal core air cell in an assembled state.
Figure 5:
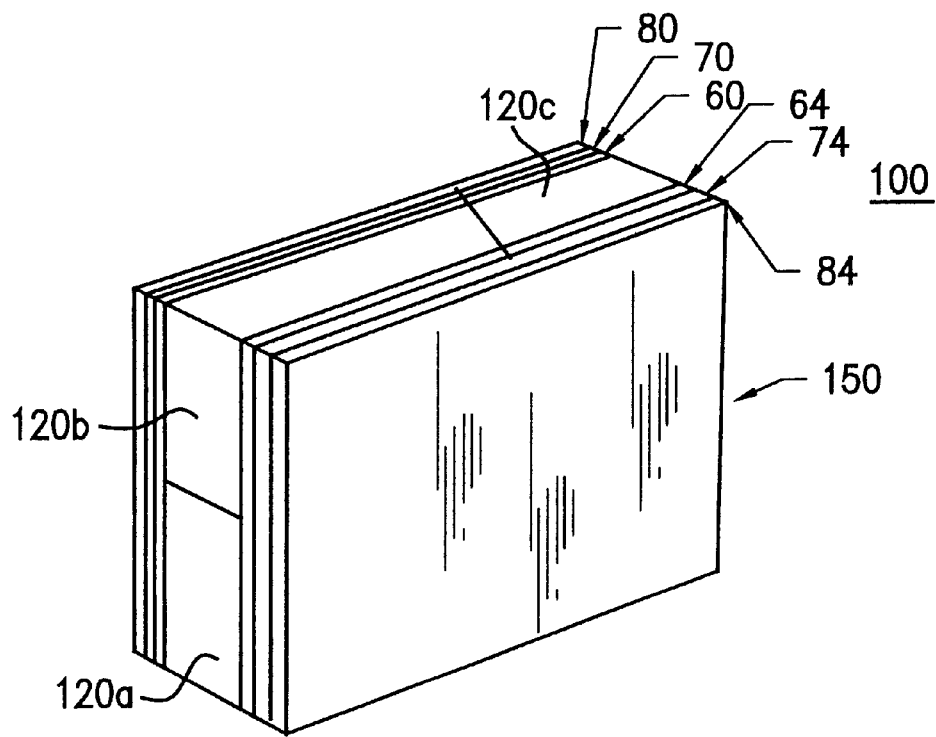
FIG. 5 is a side perspective view of the insulation panel of the first alternate embodiment of the present invention showing the metal core air cells having multi-layers of insulation sheets on both sides of the air cells in an assembled state.
Figure 6:
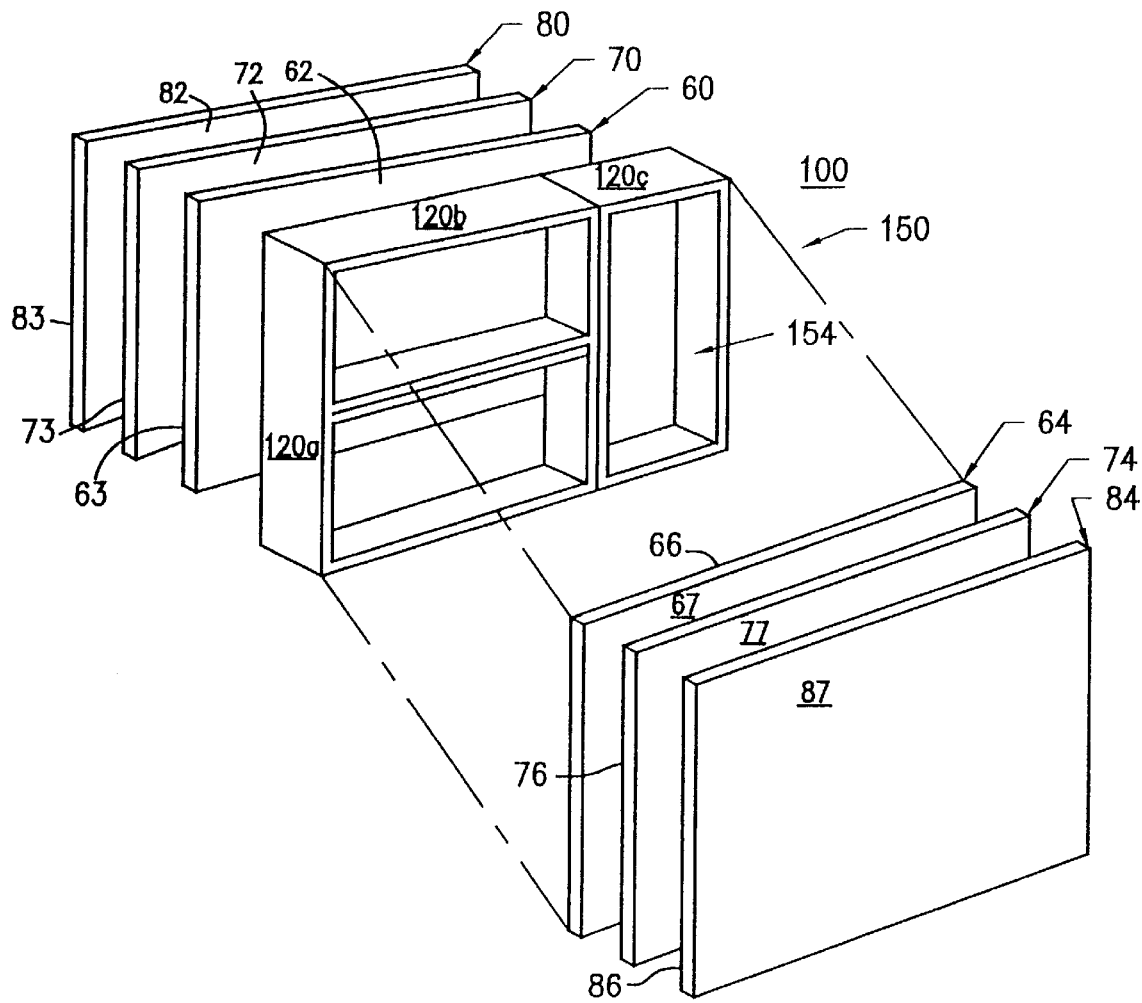
FIG. 6 is an exploded view of the insulation panel of the first alternate embodiment of the present invention showing the metal core air cells having multi-layers of insulation sheets on both sides of the air cells in an unassembled state.
Figure 7:
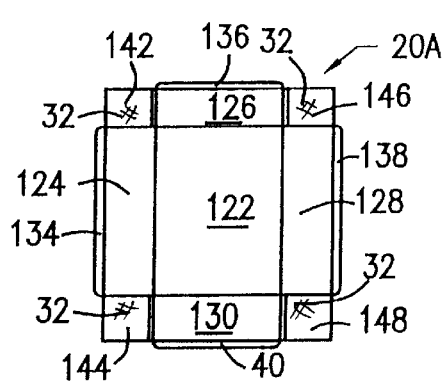
FIG. 7 is a top plan view of the insulation panel of the first alternate embodiment of the present invention showing the one piece metal foil die cut and scored box blank.
Figure 8:
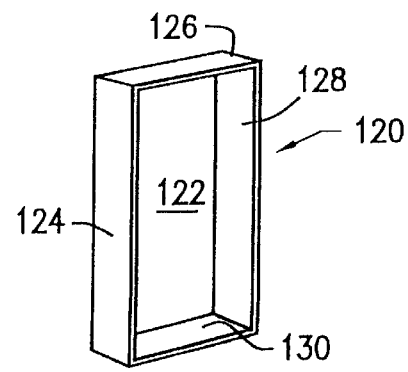
FIG. 8 is a rear perspective view of the insulation panel of the first alternate embodiment of the present invention showing a single metal core air cell in an assembled state.
Figure 9:
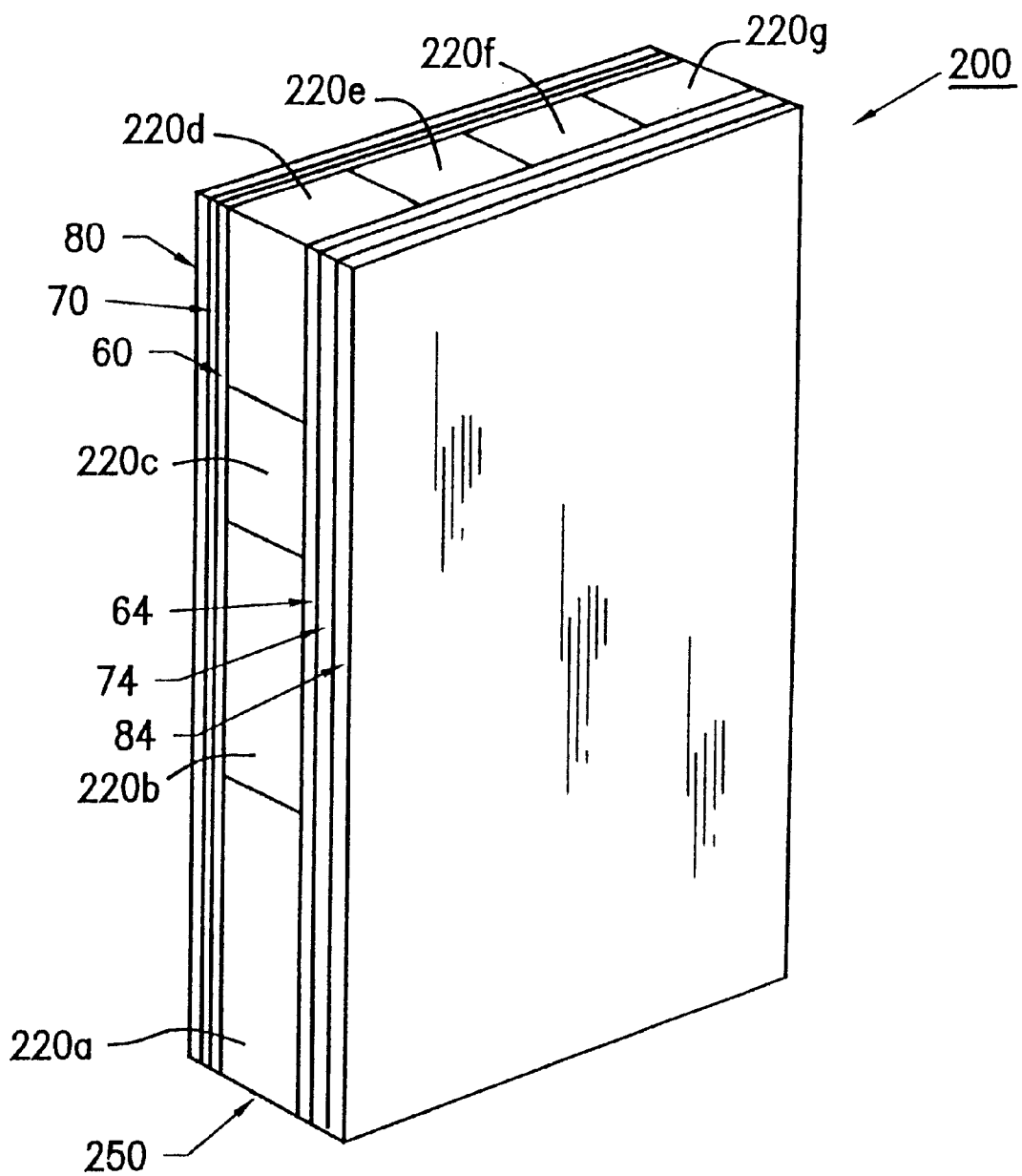
FIG. 9 is a side perspective view of the insulation panel of the second alternate embodiment of the present invention showing the metal core air cells having multi-layers of insulation sheets on both sides of the air cells in an assembled state.
Figure 10:
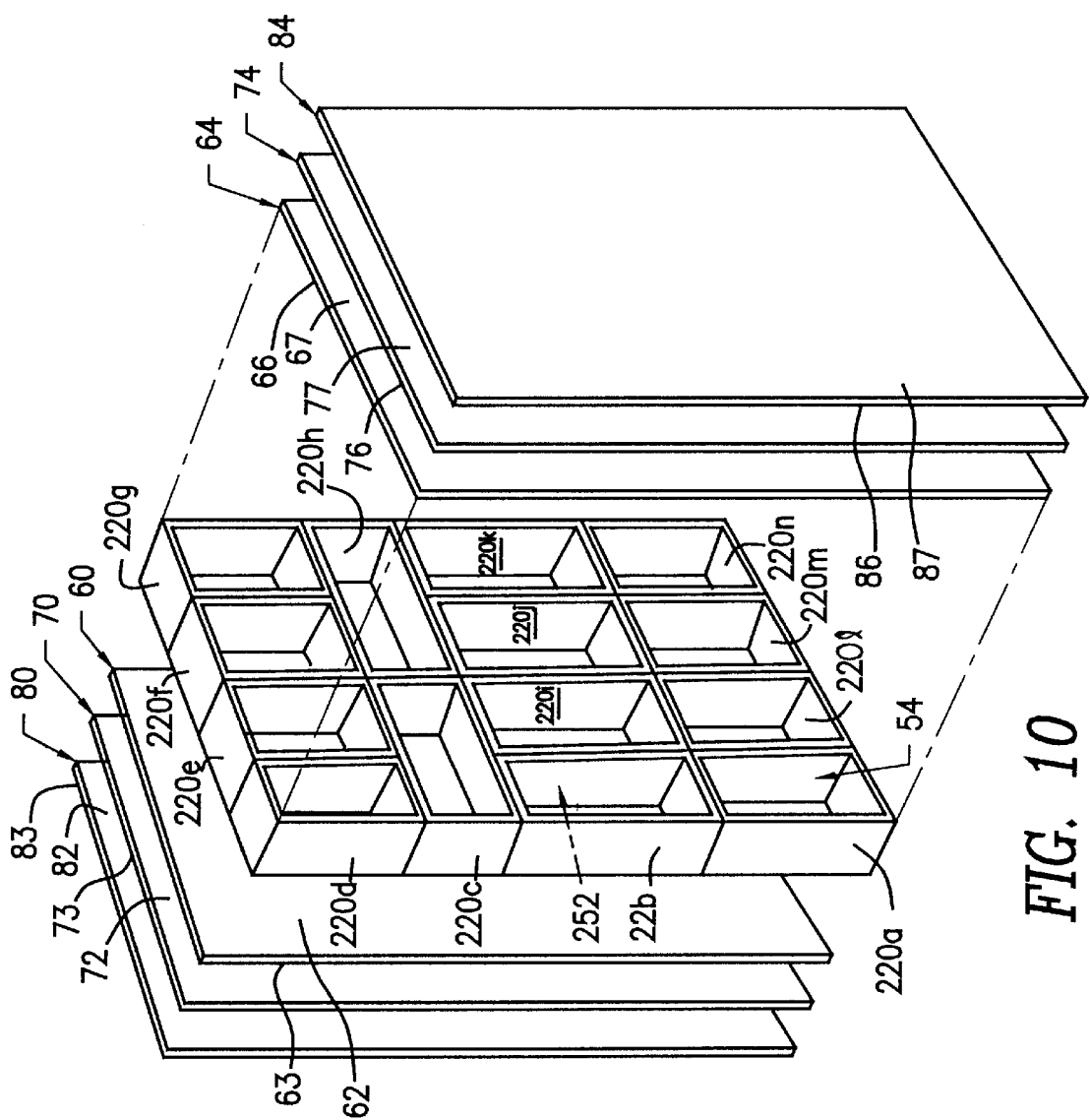
FIG. 10 is an exploded view of the insulation panel of the second alternate embodiment of the present invention showing the metal core air cells having multi-layers of insulation sheets on both sides of the air cells in an unassembled state.

The insulation blankets/insulation panels 10, 100 and 200 of the preferred embodiment and first and second alternate embodiments of the present invention are represented in FIGS. 1 through 10 of the drawings. The insulation panels 10, 100 and 200 are formed from a plurality of metal foil die-cut and scored box blanks 20A, and 120A which are made into five-sided open boxes 20 and 120. A given plurality of metal foil boxes 20 and 120 are attached to each other in a pre-set configuration to form air cell modules 50, 150 and 250, where then multiple composite layers of insulation materials cover each side of the air cell modules 50, 150, and 250, as depicted in FIGS. 2, 6, and 10, for forming of insulation panels 10, 100 and 200, respectively, as depicted in FIGS. 1, 5, and 9 of the drawings.

Figure 11:
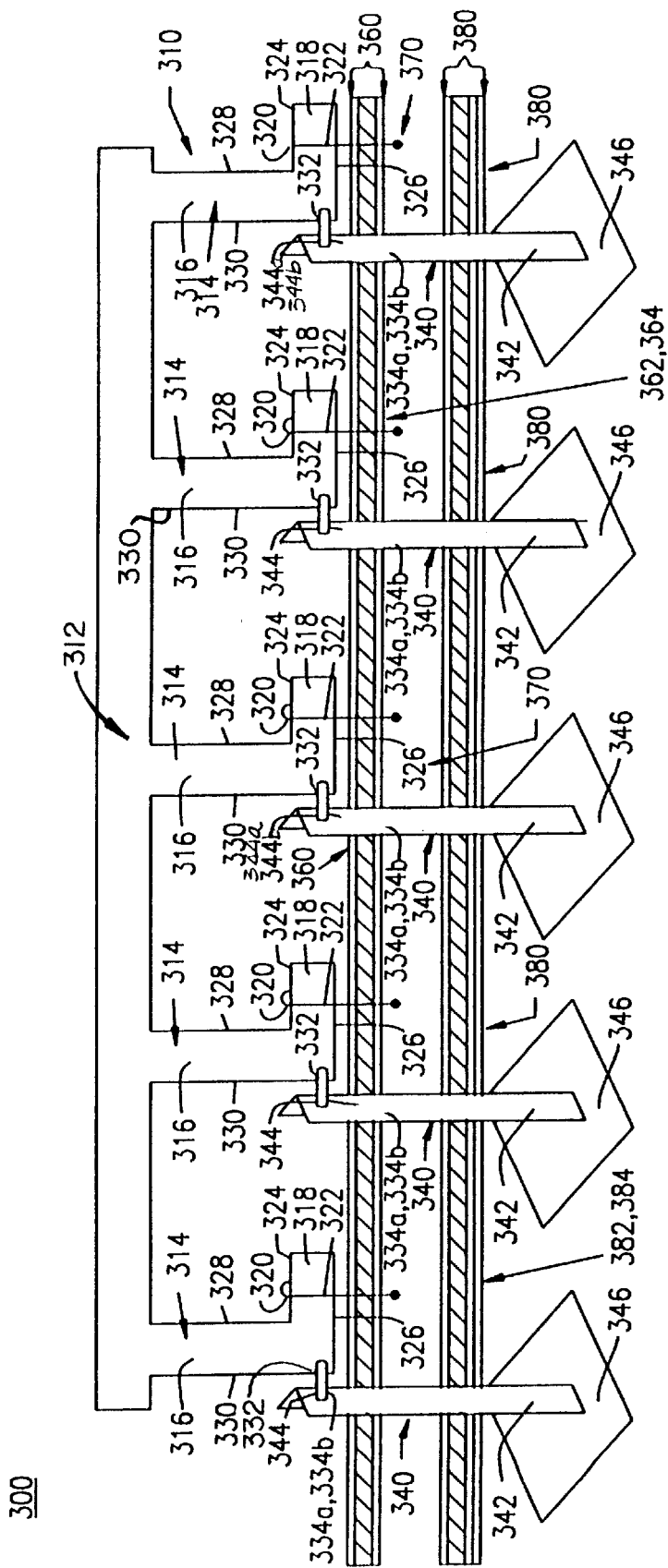
FIG. 11 is a partial perspective and sectional view of the insulation panel of the third alternate embodiment of the present invention in an overhead configuration showing the metal core air cells having multi-layers of insulation sheets on both sides of the air cells in an assembled state.
Figure 14:
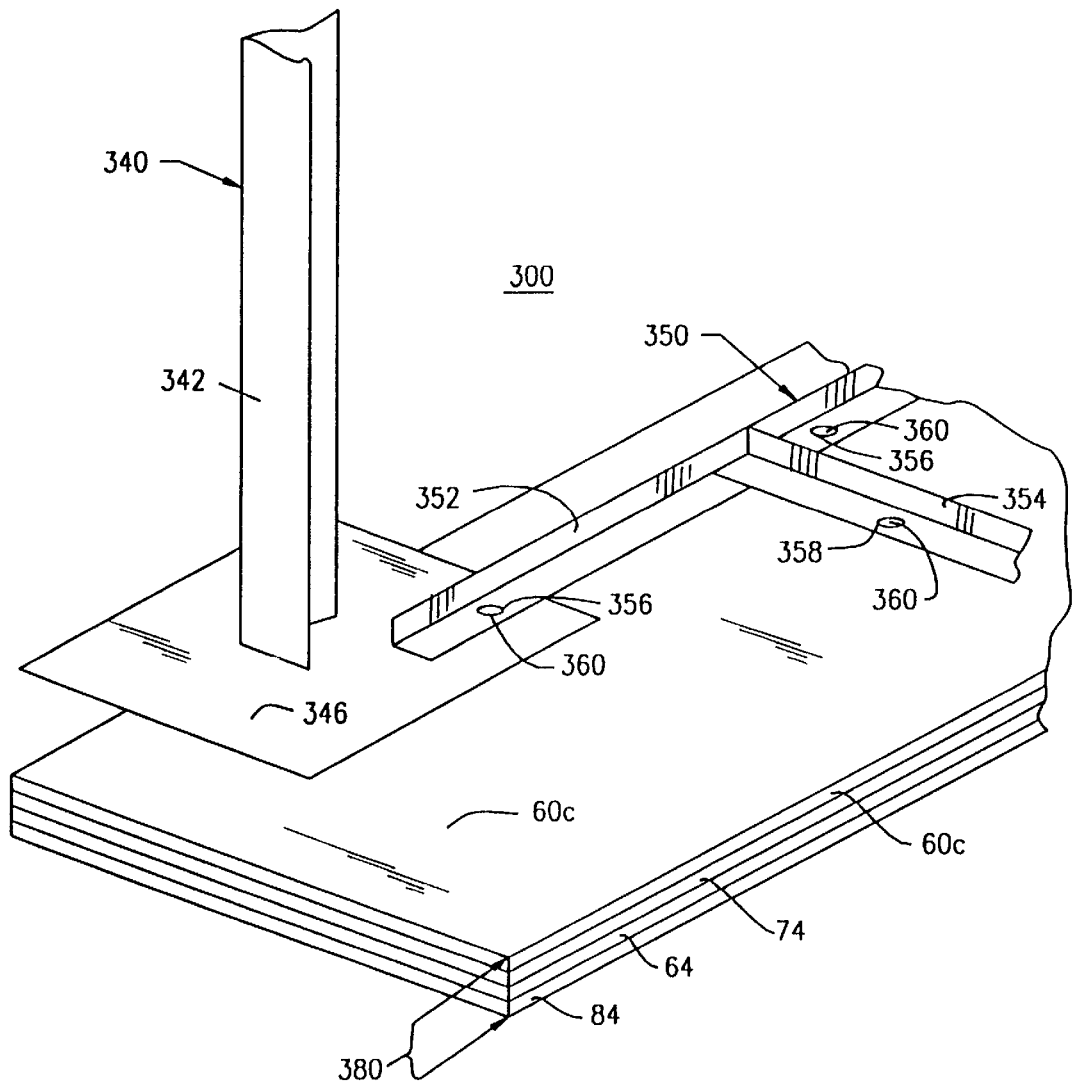
FIG. 14 is a perspective view of the insulation panel of the third alternate embodiment of the present invention showing the holding component, the lower hanging panel, and the lower composite insulation section being attached to each other.
Figure 15:
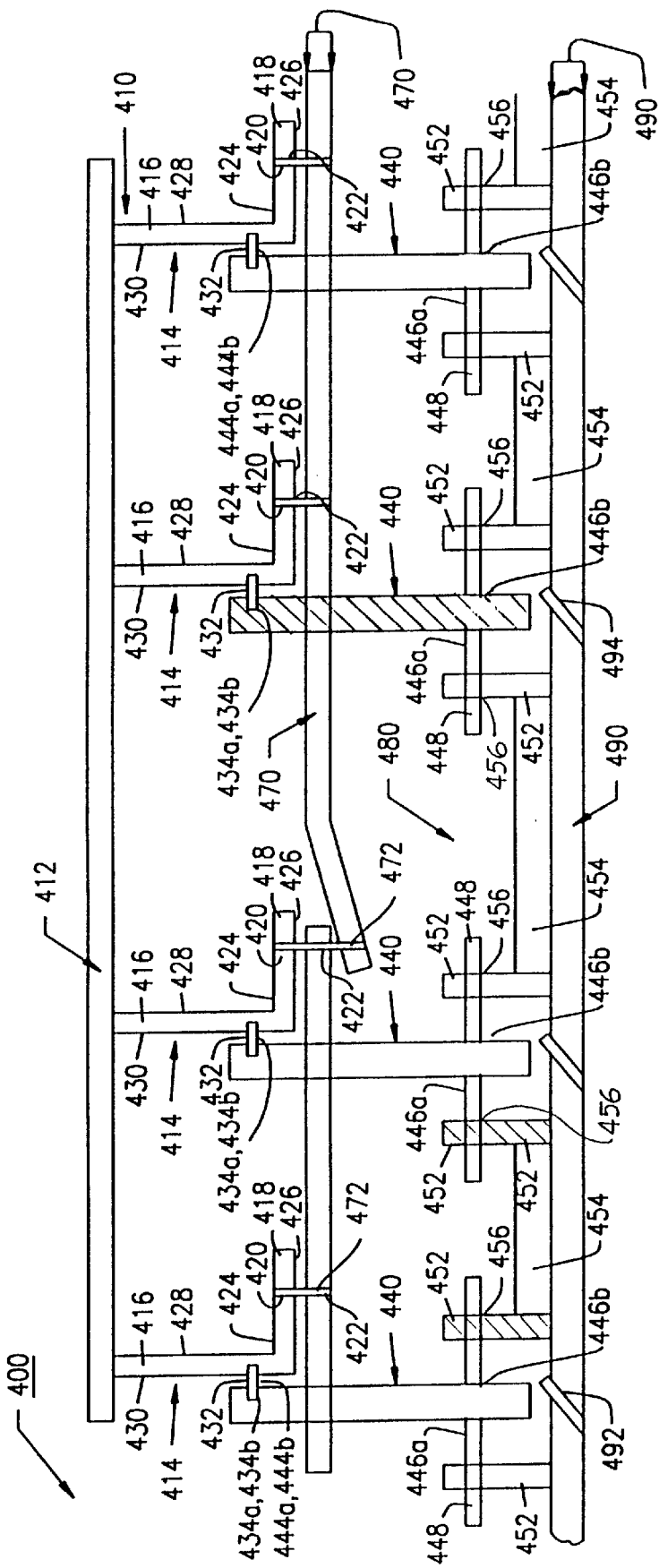
FIG. 15 is a sectional view of the insulation panel of the fourth alternate embodiment of the present invention showing the metal core air cells having multi-layers of insulation sheets on both sides of the air cells in an assembled state.
Figure 18:
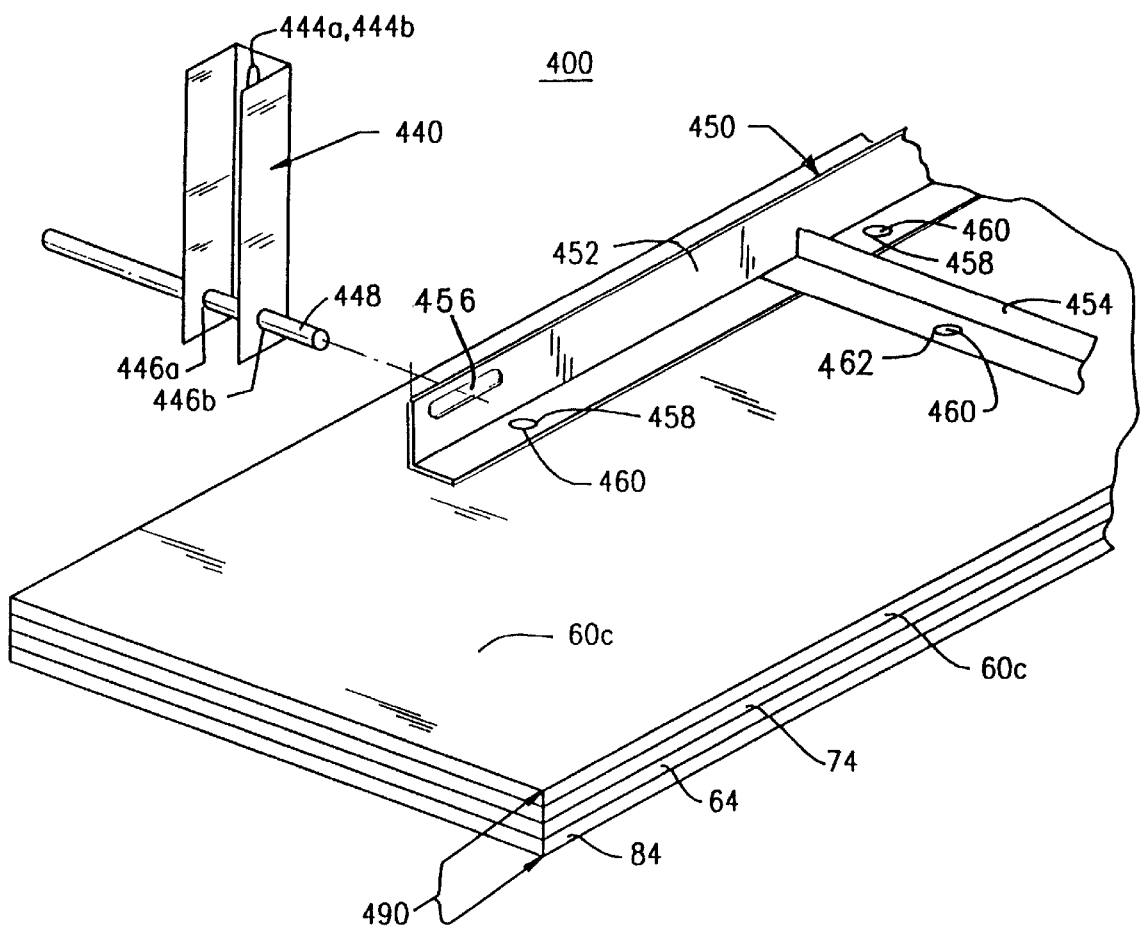
FIG. 18 is an exploded perspective view of the insulation panel of the fourth alternate embodiment of the present invention showing the holding component, the lower hanging panel, and the lower composite insulation section being attached to each other.
Figure 19:
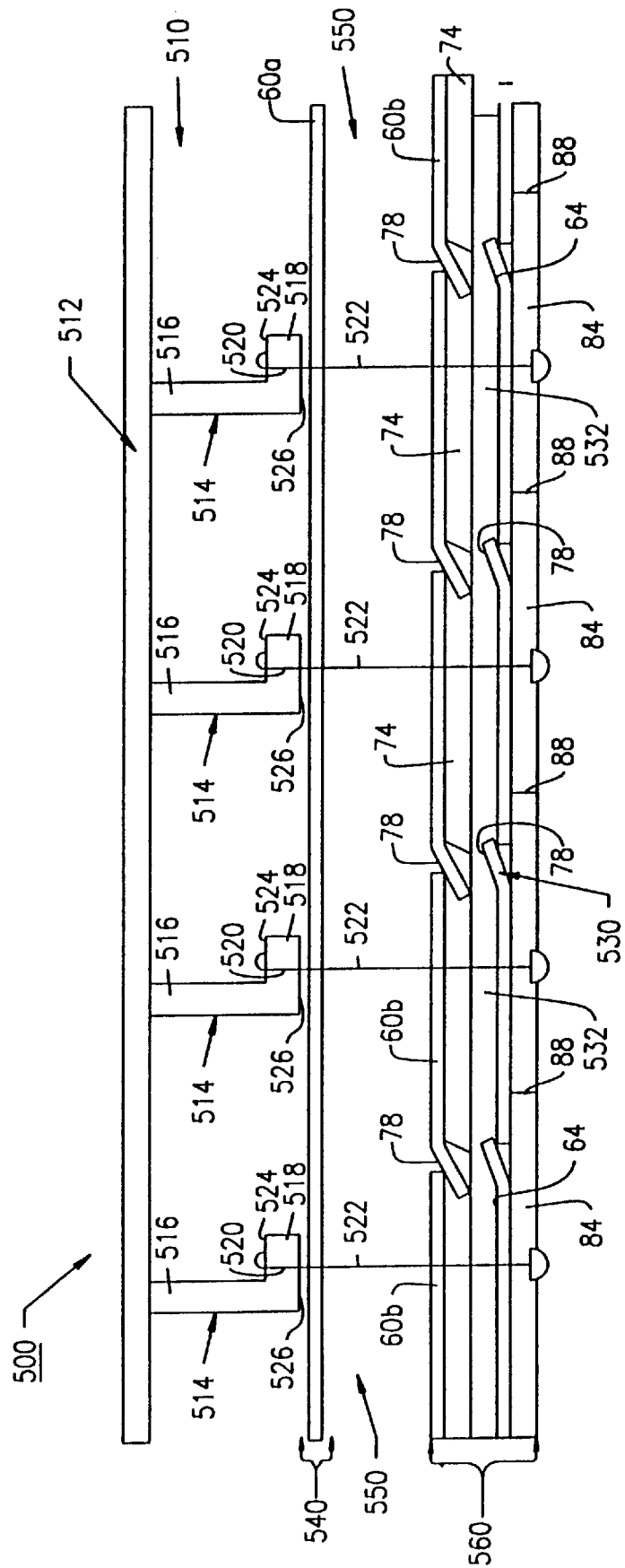
FIG. 19 is a sectional view of the insulation panel of the fifth alternate embodiment of the present invention showing the metal core air cells having insulation sections on both sides of the air cells in an assembled state.

The insulation blankets/insulation panels 300, 400 and 500 of the third, fourth and fifth alternate embodiments of the present invention are represented in FIGS. 11 through 20 of the drawings. The insulation panels 300, 400 and 500 are formed by using upper and lower composite insulation sections 360 and 380; 470 and 490; and 540 and 560, respectively, and having an air space/cell 370; 480; and 550 between the aforementioned composite upper and lower insulation sections in conjunction with attachment to deckhead panel hanging systems 310, 410 and 510, respectively. Insulation panels 300, 400, and 500, as shown in FIGS. 11, 15, and 19 of the drawings, have inner core air cells 370, 480, and 550 with adjoining insulation layered sections 360 and 380; 470 and 490; and 540 and 560, respectively, for fire and heat protection. The inner core air cells 370, 480 and 550 also act as an additional insulation barrier in the event of a fire.

DETAILED DESCRIPTION OF THE PREFERRED EMBODIMENT

The insulation blanket/insulation panel 10 of the preferred embodiment of the present invention are represented in FIGS. 1 through 4 of the drawings. Insulation panel 10 of the preferred embodiment of the present invention includes a plurality of four connected inner core metal air cells units 20 which form a single inner core metal air cell module 50 having inner first layers 60 and 64 formed of metal foil sheets; middle second layers 70 and 74 formed of ceramic-based material sheets; and outer third layers 80 and 84 formed of an intumescent, fire-retardant coating on fiberglass material sheets; as depicted in FIGS. 1 and 2 of the drawings.

A single inner core metal air cell unit 20, is shown in FIGS. 3 and 4 of the drawings, and is formed from a metal foil die-cut and scored box blank 20A and is made into a five-sided open box 20. Metal foil blank 20A is made of steel or aluminum foil being foldable, durable and of sufficient tensile strength as not to bend. Metal foil blank 20A which is die-stamped, as shown in FIG. 3, includes a bottom wall 22 with integrally attached side panel walls 24, 26, 28, and 30. Each side panel wall 24, 26, 28, and 30 has an integrally attached perimeter lip edge 34, 36, 38, and 40, respectively, for use in attaching the rear inner layer 64 to the plurality of air cell units 20. In addition, side panel walls 24 and 28 further include integrally attached inner locking corner panels 42, 44, 46, and 48, respectively, for attaching to side panel walls 26 and 30 via a self-adhesive glue 32 for forming the single inner core metal air cell 20, as shown in FIG. 4 of the drawings.

As previously mentioned, insulation panel 10 consists of four air cell units 20 fastened together to form a single air cell module 50. Each air cell module 50 acts as an additional insulation barrier in the event of a fire. Each module 50 includes a front side 52 and a rear side 54 which are then covered by inner first layers 60 and 64; middle second layers 70 and 74; and outer third layers 80 and 84.

Inner first layers 60 and 64 are made of thin sheets of aluminum or steel foil. Front side inner first layer 60 has front and rear surfaces 62 and 63; and rear side inner first layer 64 has front and rear surfaces 66 and 67.

Middle second layers 70 and 74 are made of ceramic-based material sheets consisting of ceramic fibers, mineral wool, fiberglass or silica. Front side middle second layer 70 has front and rear surfaces 72 and 73; and rear side middle second layer 74 has front and rear surfaces 76 and 77.

Outer third layers 80 and 84 are made of an intumescent, fire-retardant coating on fiberglass material sheets having a standard fiber or metal layer thereon of stainless steel, TYVEK™ being high density polyethylenes, NOMEX™ being polisophthaloil-chloride-M-phenylenediamines, KEVLAR™ being poly-para-phenyleneterephthalamides, or aluminum. Front side outer third layer 80 has front and rear surfaces 86 and 87; and rear side outer third layer 84 has front and rear surfaces 86 and 87.

The physical measurements of module 50 of insulation panel 10 in an assembled state has a width measurement of twenty-four inches (24"), a height measurement of twenty-four inches (24") and a thickness measurement of two inches (2"). Each air cell unit 20 in an assembled state has a width measurement of twelve inches (12"), a height measurement of twelve inches (12") and a thickness measurement of two inches (2"). The inner first layers 60 and 64 have a thickness measurement of 0.002 to 0.020 inches; the middle second layers 70 and 74 have a thickness measurement in the range of one-quarter of an inch (¼") to one-half of an inch (½"); and the outer third layers 80 and 84 have a thickness in the range of one-quarter of inch (¼") to one-half of an inch (½").

DETAILED DESCRIPTION OF THE ALTERNATE EMBODIMENTS

FIRST ALTERNATE EMBODIMENT 100

The insulation blanket/insulation panel 100 of the first alternate embodiment of the present invention is represented in FIGS. 5 through 8 of the drawings. Insulation panel 100 of the first alternate embodiment of the present invention includes a plurality of three (3) connected inner core metal air cell units 120 which form a single inner core metal air cell module 150 having inner first layers 60 and 64 formed of metal foil sheets; middle second layers 70 and 74 formed of ceramic-based material sheets; and outer third layers 80 and 84 formed of an intumescent, fire-retardant coating on fiberglass material sheets; as depicted in FIGS. 5 and 6 of the drawings.

A single inner core metal air cell unit 120, is shown in FIGS. 7 and 8 of the drawings, and is formed from a metal foil die-cut and scored box blank 120A and is made into a five-sided open box 120. Metal foil blank 120A is made of steel or aluminum foil being foldable, durable and of sufficient tensile strength as not to bend. Metal foil blank 120A which is die-stamped, as shown in FIG. 7, includes a bottom wall 122 with integrally attached side panel walls 124, 126, 128, and 130. Each side panel wall 124, 126, 128, and 130 has an integrally attached perimeter lip edge 134, 136, 138, and 140, respectively, for use in attaching the rear inner layer 64 to the plurality of air cell units 120. In addition, side panel walls 124 and 128 further include integrally attached inner locking corner panels 142, 144, 146, and 148, respectively, for attaching to side panel walls 126 and 130 via a self-adhesive glue 32 for forming the single inner core metal air cell 120, as shown in FIG. 8 of the drawings.

As previously mentioned, insulation panel 100 consists of three air cell units 120 fastened together to form a single air cell module 150. Each air cell module 150 acts as an additional insulation barrier in the event of a fire. Each module 150 includes a front side 152 and a rear side 154 which are then covered by inner first layers 60 and 64; middle second layers 70 and 74; and outer third layers 80 and 84.

The physical measurements of module 150 of insulation panel 100 in an assembled state has a width measurement of thirty-six inches (36"), a height measurement of twenty-four inches (24") and a thickness measurement of approximately three inches (3"). Each air cell unit 120 in an assembled state has a width measurement of twenty-four inches (24"), a height measurement of twelve inches (12") and a thickness measurement of two inches (2"). The inner first layers 60 and 64 have a thickness measurement of 0.002 to 0.020 inches; the middle second layers 70 and 74 have a thickness measurement in the range of one-quarter of an inch (¼") to one-half of an inch (½"); and the outer third layers 80 and 84 have a thickness in the range of one-quarter of inch (¼") to one-half of an inch (½").

SECOND ALTERNATE EMBODIMENT 200

The insulation blanket/insulation panel 200 of the second alternate embodiment of the present invention is represented in FIGS. 9 and 10 of the drawings. Insulation panel 200 of the second alternate embodiment of the present invention includes a plurality of fourteen (14) connected inner core metal air cell units 220 which form a single inner core metal air cell module 250 having inner first layers 60 and 64 of metal foil sheets; middle second layers 70 and 74 of ceramic-based material sheets; and outer third layers 80 and 84 of an intumescent, fire-retardant coating on fiberglass material sheets; as depicted in FIGS. 9 and 10 of the drawings. The second alternate embodiment 200 is the same as first alternate embodiment 100 except for the number of air cell units 220 used to form air cell module 250 and the overall size of inner, middle, and outer layers 60, 64, 70, 74, 80, and 84 used to form the insulation panel 200. Air cell module 250 includes a front side 252 and rear side 254. Each air cell module 250 acts as an additional insulation barrier in the event of a fire. In all other assembly aspects, the second alternate embodiment 200 is assembled in the same manner and fashion as in the preferred and alternate embodiments 10 and 100.

The physical measurements of module 250 of insulation panel 200 in an assembled state has a width measurement of forty-eight inches (48"), a height measurement of eighty-four inches (84") and a thickness measurement of approximately four inches (4"). Each air cell unit 220 in an assembled state has a width measurement of twenty-four inches (24"), a height measurement of twelve inches (12") and a thickness measurement of three inches (3"). The inner first layers 60 and 64 have a thickness measurement of 0.002 to 0.020 inches; the middle second layers 70 and 74 have a thickness measurement in the range of one-quarter of an inch (¼") to one-half of an inch (½"); and the outer third layers 80 and 84 have a thickness in the range of one-quarter of inch (¼") to one-half of an inch (½").

THIRD ALTERNATE EMBODIMENT 300

The insulation blanket/insulation panel 300 of the third alternate embodiment of the present invention is represented in FIGS. 11 to 14 of the drawings. Insulation panel 300 is used for an overhead panel system 310 for a ship. As part of the ship, the overhead panel system 310 includes a main support component 312 having a plurality of spaced-apart L-shaped stiffeners 314 each having a vertical section 316 and a horizontal section 318 being integrally connected to the support component 312, as depicted in FIG. 11 of the drawings.

Each horizontal member section 318 of L-shaped stiffeners 314 includes a hole opening 320 having a connecting pin 322 therein. Horizontal member section 318 further includes a top wall surface 324 and a bottom wall surface 326; and vertical member section 316 further includes an inner wall surface 328 and an outer wall surface 330. The outer wall surface 330 of each L-shaped stiffener 314 includes a hole opening 332 having a pair of connecting rods 334a and 334b for attachment to connecting hole openings 344a and 344b of holding component 340. Holding component 340 includes an angle bracket 342 having hole openings 344a and 344b for connecting rods 334a and 334b being integrally attached to a base member 346. Holding component 340 is detachably connected to each L-shaped stiffener 314 via connecting rods 334a and 334b; as depicted in FIG. 11 of the drawings.

The deckhead panel hanging system 310 also includes a lower hanging panel 350 in the form of a plurality of side brackets 352 and cross-member brackets 354 made of aluminum, as shown in FIG. 14 of the drawings. Each of the side brackets 352 have a plurality of lower hole openings 356 for rivets 360. Each of the cross-member brackets 354 have a plurality of lower hole openings 358 for rivets 360. The plurality of aluminum brackets 352 are laminated and riveted to the base member 346 of holding component 340 via rivets 360 which in turn is attached to the aluminum foil layer 60c of the lower composite insulation section 380 via rivets 360.

The insulation panel 300 is formed of two composite upper and lower insulation sections 360 and 380, and have an air space/cell 370 between the aforementioned composite upper and lower insulation sections 360 and 380. The insulation blanket/panel 300 provides fire and heat protection, and the inner core air cell 370 acts as an additional insulation barrier in the event of a fire.

The upper composite insulation section 360, as shown in FIG. 12, includes a top layer of aluminum foil 60a, a middle layer of a ceramic-based sheet material 70 and a bottom layer of aluminum foil 60b. The upper insulation section 360 is attached to the overhead L-shaped stiffeners 314 via connecting pins 322. The plurality of upper insulation sections 360 may be installed using butt joints 362 or overlap joints 364.

The lower composite insulation section 380, as shown in FIG. 13, includes a top first layer of aluminum foil 60c, a second layer of a ceramic-based sheet material 74, a third layer of stainless steel foil 64, and a bottom fourth layer of an intumescent fiberglass material 84. The aluminum foil layer 60c is attached to the base members 346 of holding components 340 via the aluminum side bracket 352 of the lower hanging panel 350. The lower composite section 380 is hung from the L-shaped stiffeners 314 via the lower hanging panel 350 and by using the aluminum angle brackets 342 which are pinned to the L-shaped stiffeners 314 via connecting rods 334. The lower composite insulation section 380 is hung such that an air space/cell 370 is formed between the upper and lower insulation sections 360 and 380.

FOURTH ALTERNATE EMBODIMENT 400

The insulation blanket/insulation panel 400 of the fourth alternate embodiment of the present invention is represented in FIGS. 15 to 18 of the drawings. Insulation panel 400 is used with a deckhead panel hanging system 410 in insulating the overhead area of a ship. As part of the ship, the deckhead panel hanging system 410 includes a main support component 412 having a plurality of spaced-apart L-shaped stiffeners 414 each having vertical and horizontal member sections 416 and 418, respectively. The vertical member section 416 of each L-shaped stiffener 414 is integrally connected to the main support component 412, as depicted in FIG. 15 of the drawings.

Each horizontal member section 418 of the L-shaped stiffeners 414 includes a hole opening 420 having a connecting pin 422 therein. Horizontal member section 418 further includes a top wall surface 424 and a bottom wall surface 426; and vertical member section 416 further includes an inner wall surface 428 and an outer wall surface 430. The outer wall surface 430 of each L-shaped stiffener 414 includes a hole opening 432 having a pair of first connecting rods 434a and 434b for attachment to connecting hole openings 444a and 444b of holding angle bracket 440. Holding angle bracket 440 includes a second pair of connecting hole openings 446a and 446b for receiving a second connecting rod 448.

The deckhead panel hanging system 410 also includes a lower hanging panel 450 in the form of a plurality of side brackets 452 and cross-member brackets 454 made of aluminum, as depicted in FIG. 18 of the drawings. Each of the side brackets 452 have a plurality of upper hole openings 456 for receiving connecting rod 448; and have a plurality of lower hole openings 458 for rivets 460. Each of the cross-member brackets 454 has a plurality of lower hole openings 462 for rivets 460. The plurality of aluminum brackets 452 and 454 are laminated and riveted to the aluminum foil layer 60c of the lower composite insulation section 490 via rivets 460. Angle bracket 440 is detachably connected to each L-shaped stiffener 414 via connecting rods 434a and 434b; and angle bracket 440 is also detachably connected to the lower hanging panels 450 via connecting rods 448.

The insulation panel 400 includes upper and lower composite insulation sections 470 and 490 having an air space/cell 480 between the aforementioned insulation sections 470 and 490, respectively. The insulation blanket/panel 400 provides fire and heat protection, and the inner core air cell 480 acts as an additional insulation barrier in the event of a fire.

Figures 16, 17:
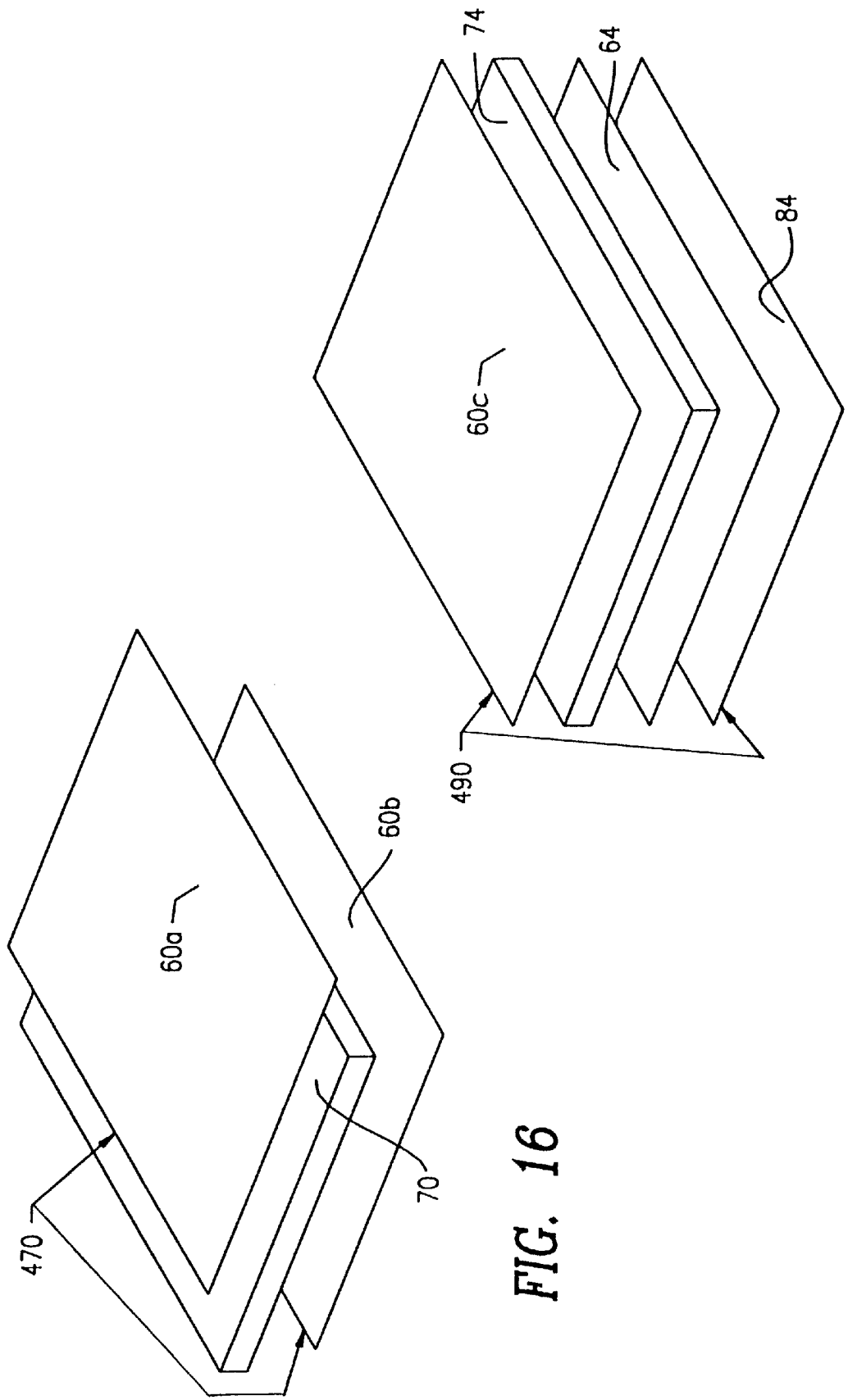
FIG. 16 is an exploded perspective view of the insulation panel of the fourth alternate embodiment of the present invention showing the upper composite insulation section having multi-layers of insulation sheets in an unassembled state.
FIG. 17 is an exploded perspective view of the insulation panel of the fourth alternate embodiment of the present invention showing the lower composite insulation section having multi-layers of insulation sheets in an unassembled state.

The upper composite insulation section 470, as shown in FIG. 16, includes a top layer of aluminum foil 60a, a middle layer of a ceramic-based sheet material 70 and a bottom layer of aluminum foil 60b. The upper insulation section 470 is attached to the overhead L-shaped stiffeners 414 via connecting pins 422. The plurality of upper insulation sections 470 may be installed using butt joints 472 or overlap joints 474.

The lower composite insulation section 490, as shown in FIG. 17, includes a top first layer of aluminum foil 60c, a second layer of a ceramic-based sheet material 74, a third layer of stainless steel foil 64, and a bottom fourth layer of an intumescent fiberglass material 84. The aluminum foil layer 60c of the lower composite insulation section 490 is attached to the aluminum brackets 452 and 454 of the lower hanging panel 450 via rivets 460 within respective hole openings 458 and 462 of brackets 452 and 454, as depicted in FIG. 18 of the drawings. The plurality of the lower composite insulation sections 490 may be installed using butt joints 492 or overlap joints 494. The lower composite insulation section 490 is hung from the upper hole openings 456 within side brackets 452 via connecting rods 448 in which connecting rods 448 are detachably connected to the holding angle bracket 440 through connecting hole openings 446a and 446b, as shown in FIG. 18 of the drawings. The lower composite insulation section 490 is hung such that an air space/cell 480 is formed between the upper and lower composite sections 470 and 490, respectively.

FIFTH ALTERNATE EMBODIMENT 500

Figure 20:
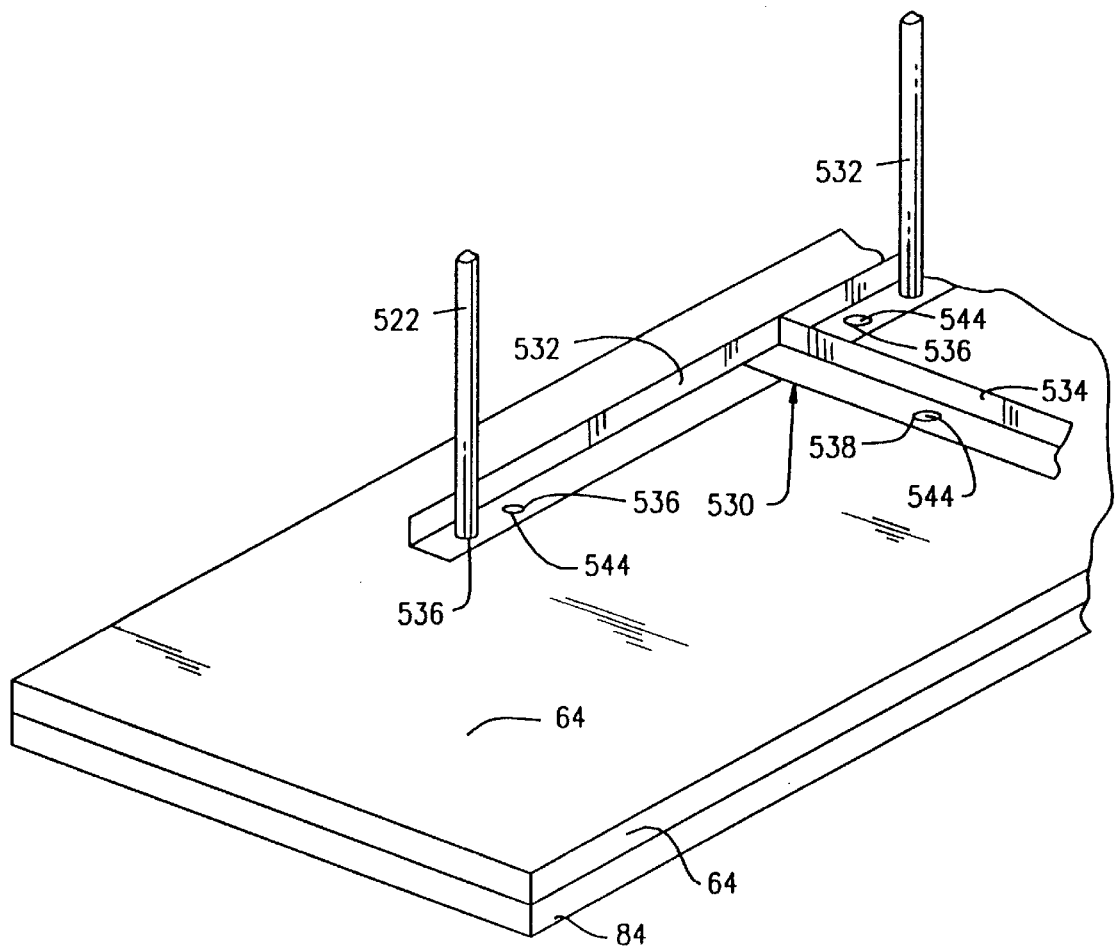
FIG. 20 is a partial perspective view of the insulation panel of the fifth alternate embodiment of the present invention showing the connecting rods, the lower hanging panel and two of the lower insulation sheets being attached to the connecting rods and the lower hanging panel.

The insulation blanket/insulation panel 500 of the fifth alternate embodiment of the present invention is represented in FIGS. 19 and 20 of the drawings. Insulation panel 500 is used for a deckhead panel hanging system 510. As part of the ship, the deckhead panel hanging system 510 includes a main support component 512 having a plurality of spaced-apart L-shaped stiffeners 514 each having vertical and horizontal member sections 516 and 518. The vertical member section 516 of each L-shaped stiffener 514 is integrally connected to the main support component 512, as depicted in FIG. 19 of the drawings.

Each horizontal member section 518 of the L-shaped stiffeners 514 includes a hole opening 520 having a connecting pin 522 therein. Horizontal member section 518 further includes a top wall surface 524 and a bottom wall surface 526. In addition, the deckhead panel hanging system 510 further includes the upper insulation section 540 of aluminum foil 60 that is permanently attached to the bottom wall surface 526 of the L-shaped stiffeners 514 via gluing, epoxy cement or the like. The deckhead panel hanging system 510 also includes a lower hanging panel 530 in the form of a plurality of brackets 532 and 534 made of aluminum having a plurality of hole openings 536 for receipt of the connecting pins 522 therein. The plurality of aluminum brackets 532 and 534 are laminated and riveted to the steel foil layer 64 of the lower insulation composite section 560 via rivets 544, as shown in FIG. 20 of the drawings.

The insulation panel 500 includes a composite upper insulation section 540 and a composite lower insulation section 560 having an air space 550 between the aforementioned upper insulation section 540 and the lower insulation section 560, respectively. Insulation blanket/panel 500 has an inner core air cell 550 and adjoining insulation sections 540 and 560 attached thereto for fire and heat protection. The inner core air cell 550 also acts as an additional insulation barrier in the event of a fire. The upper insulation section 540 as previously mentioned is a single sheet of aluminum foil 60*a*, as shown in FIG. 19 of the drawings.

The lower composite insulation section 560 includes a top first layer of aluminum foil 60*b* a second layer of a ceramic-based sheet material 74 having overlap joints 78, a third layer of stainless steel foil 64 having overlap joints 68, and a bottom fourth layer of an intumescent fiberglass material sheet 84 having butt joints 88, as shown in FIG. 19 of the drawings. Aluminum foil first layer 60*b* is in contact with and adjacent to the ceramic-based material second layer 74; where then the ceramic-based material second layer 74 is in contact with and adjacent to the stainless steel foil third layer 64; where then the stainless steel foil third layer 64 is in contact with and adjacent to the intumescent fiberglass material fourth layer 84. The lower composite insulation section 560 of panel 500 is hung from the deckhead panel hanging system 510 via the plurality of connecting pins 522, as depicted in FIG. 19 of the drawings.

EXAMPLE 1

A fire insulation panel 10 was used having a dimension of 2 feet by 2 feet. The panel 10 included inner core metal air cell units 20 made of stainless steel foil being two and a half inches (2½") thick and having inner first layers 60 and 64 made of stainless steel foil sheets; middle second layers 70 and 74 made of ceramic fiber sheets having a density of six pounds per cubic foot (6 lb/ft$^3$) and having a thickness of a quarter of an inch (¼"); and outer third layers 80 and 84 made of intumescent, fire-retardant coating having a weight of sixteen ounces (16 oz) per square yard made of No Fire A18 on a woven fiberglass sheet (Standard 7642).

The two foot by two foot panels 10 are installed as the wall of an oven, and heated with a 100,000 BTU/HR propane burner at 2300° F. The oven is heated according to the requirements of ASTM E119. The temperature of a steel outer wall of the oven adjacent to the rear surface 87 of outer third layer 84 of the insulation panels 10 is measured over a period of time. The temperature of the aforementioned steel panel does not exceed 139° C. above ambient for in excess of eighty (80) minutes.

EXAMPLE 2

A fire insulation panel 10 was constructed similar to Example 1, except that the middle second layers 70 and 74 have a density of six pounds per cubic foot (6 lbs/ft$^3$), and are a half inch (½") thick ceramic fiber blanket sheets. The insulation panels 10 are installed as the wall of an oven, similar to the oven configuration in example 1. The oven is heated according to the requirements of UL 1709. The steel panel temperature does not exceed 232° C. for in excess of thirty-five (35) minutes.

EXAMPLE 3

A fire insulation panel 300 for the overhead section of a high speed ferry boat is constructed according to the third alternate embodiment, as shown in FIG. 11 of the drawings. The two foot by two foot lower panel section 380 is constructed as follows: an inner first sheet 60*c* of 0.002 inch thick aluminum foil; a second sheet 74 of ¼ inch thick, 3 lbs/cubic feet density ceramic blanket; a third sheet 64 of 0.002 inch thick stainless steel foil; and an outer fourth sheet 84 of a No Fire™ 7642/S1 fiberglass coated textile. The upper panel section 360 is constructed of a middle sheet 70 being a ¼ inch thick, 3 lb/cubic feet density ceramic blanket having top and bottom sheets 60*a* and 60*b* of 0.002 inch thick aluminum foil thereon. There is a three inch air space 370 between the upper and lower panel sections 360 and 380, respectively, as shown in FIG. 11. This overhead assembly is mounted on top of an oven, which is heated according to the requirements of ASTM E119. The temperature of the overhead panel 300 does not exceed an average temperature of 270° F. for 60 minutes. The entire panel system 300, including hangars and pins, does not exceed 240 grams/sqft (2.6 kg/sq meter).

APPLICATION AND USES OF THE PRESENT INVENTION

The insulation panels 10, 100, 200, 300, 400 and 500 of the present invention can be used in a variety of product applications in which fireproofing is required by various governmental agencies or others. Fire proofing applications using the insulation panels 10, 100, 200, 300, 400 and 500 can include office equipment, manufacturing equipment, commercial and industrial buildings, railroad and subway stations, standard modes of vehicular transport, and military applications. Office equipment applications would include safes, security filing cabinets, and the like. Manufacturing equipment applications would include industrial ovens, furnaces, heaters, smelters, burners, welders, storage tanks, and the like. Commercial and industrial plant building applications would include load-bearing walls, rafters, floors, building facings, hung ceilings, electrical conduits, cargo areas, construction bays, and the like. Vehicular transport applications can include fireproof walls in which to protect hulls, bulkheads, overheads, engine compartments, exhaust systems, gas tanks, catalytic converters, and the like for commercial ships, aircraft, railway tanker cars, commercial/school buses and tanker trucks. Military applications can include military installations, missile launching silos, submarines, tanks, wall and ceiling structures for rocket motors and the like.

ADVANTAGES OF THE PRESENT INVENTION

Accordingly, an advantage of the present invention is that it provides for an insulation panel made from a metal core air cell having multiple layers of insulation materials on both sides (three layers on each side) of the metal core air cell for use as a fireproof, flame and heat resistant insulation barrier in which to protect hulls, bulkheads, overheads, and compartments for ships, aircraft, railway tanker cars, tanker trucks, and the like.

Another advantage of the present invention is that it provides for an insulation panel that is thin and light weight, easily installed, nontoxic to humans in the virgin or combusted state and has a finished surface wall or overhead which requires no top coating.

Another advantage of the present invention is that it provides for an insulation panel that has a minimal surface flame spread performance and which meets a class A rating according to ASTM E84 standards and has a high fire proofing quality performance standards which meets the CG A 60, UL 1709 and/or ASTM E119 criteria for severe conditions of a fireproof barrier.

Another advantage of the present invention is that it provides for an insulation panel having a novel combination of fire retardant materials where the inner core metal air cell is made of either steel or aluminum covered on both sides by an inner first layer of steel or aluminum foil, a middle second layer of a ceramic-based material, and an outer third layer of an insulation material made of an intumescent, fire-retardant coating applied onto a fiberglass sheet material.

Another advantage of the present invention is that it provides for an insulation panel that can be used to protect a variety of substrates that include steel, aluminum, or wood; and many types of composites that include vinyl esters, polyesters, phenolics and other types of resins for use in fire proofing of military installations, warehouses, commercial buildings, and the like.

Another advantage of the present invention is that it provides for an insulation panel that can be used with new or existing ceiling or wall frame assemblies and is easily installed with simple butt joints, requiring no special or additional joinery, taping, or securing.

Another advantage of the present invention is that it provides for a light weight overhead insulation panel that can be used in modern high speed, aluminum ferry boats.

Another advantage of the present invention is that it provides for an insulation panel that is sturdy, durable, and resistant to normal abrasive wear and tear.

A further advantage of the present invention is that it provides for an insulation panel which can be easily manufactured, mass produced in an automated and economical manner, and is cost efficient for a variety of applications by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An insulation blanket, comprising:
    a) an inner core air cell made of metal and having a first side for receiving a first composite and a second side for receiving a second composite;
    b) said first composite having a first inner layer formed of a metal foil sheet, a first middle layer formed of ceramic based sheets, and a first outer layer formed of an intumescent, fire-retardant coating on a fiberglass sheet;
    c) said second composite having a second inner layer formed of a metal foil sheet, a second middle layer formed of ceramic based sheets, and a second outer layer formed of an intumescent, fire-retardant coating on a fiberglass sheet;
    d) said insulation blanket provides protection at least 60 minutes at a temperature of op to 2000° F.; and
    e) said insulation blanket has a weight of less 0.5 lbs. per square foot.

2. An insulation blanket in accordance with claim 1, wherein said inner core is made of steel or aluminum foil.

3. An insulation blanket in accordance with claim 1, wherein said first and second inner layers are formed of steel or aluminum foil.

4. An insulation blanket in accordance with claim 1, wherein said first and second middle layers are formed of ceramic fibers, mineral wool, fiberglass or silica.

5. An insulation blanket in accordance with claim 1, wherein said first and second outer layers have a fiber or metal layer thereon of, high density polyethylene, polyisophthaloil-chloride-M-phenylenediamine, poly-para-phenyleneterephthalamide or aluminum.

6. An insulation blanket in accordance with claim 1, wherein a plurality of said inner core air cells form a module.

7. An insulation blanket in accordance with claim 1, wherein said inner core air cell is in the shape of a box having a bottom wall and four side walls and wherein said box is hollow.

8. An insulation blanket in accordance with claim 1, wherein said inner core air cell is a matrix of four interconnected hollow cell units made of metal.

* * * * *